(12) United States Patent
Green et al.

(10) Patent No.: US 8,329,291 B2
(45) Date of Patent: *Dec. 11, 2012

(54) MULTI-LAYERED COMPOSITE SYSTEM AND METHOD

(75) Inventors: Kenneth H. Green, Whitefish, MT (US); Willie E. Rochefort, Corvallis, OR (US); Nicholas Wannenmacher, Corvallis, OR (US); Kevin Edward Harris, Salem, OR (US); Staci Alix Van Norman, Broomfield, CO (US)

(73) Assignee: Timberline Tool, L.L.C., Kalispell, MT (US)

( * ) Notice: Subject to any disclaimer, the term of this patent is extended or adjusted under 35 U.S.C. 154(b) by 631 days.

This patent is subject to a terminal disclaimer.

(21) Appl. No.: 12/201,697

(22) Filed: Aug. 29, 2008

(65) Prior Publication Data

US 2009/0050256 A1 Feb. 26, 2009

Related U.S. Application Data

(63) Continuation-in-part of application No. 11/829,374, filed on Jul. 27, 2007, now Pat. No. 8,057,895, which is a continuation of application No. PCT/US2006/003387, filed on Jan. 31, 2006.

(60) Provisional application No. 60/648,573, filed on Jan. 31, 2005.

(51) Int. Cl.
*B32B 7/12* (2006.01)
*B32B 15/04* (2006.01)

(52) U.S. Cl. ........ 428/343; 428/346; 428/347; 428/352; 428/354; 428/355 R

(58) Field of Classification Search .................. 428/343, 428/346, 347, 352, 354, 355 R
See application file for complete search history.

(56) References Cited

U.S. PATENT DOCUMENTS

| | | | |
|---|---|---|---|
| 2,681,877 A | 6/1954 | Seymour | |
| 3,143,364 A | 8/1964 | Klein | |
| 3,865,662 A | 2/1975 | Segal | |
| 4,511,621 A | 4/1985 | Thomas et al. | |
| 4,582,292 A | 4/1986 | Glotzback et al. | |
| 5,358,994 A | 10/1994 | Mallow | |
| 5,732,743 A | 3/1998 | Livesay | |
| 6,553,838 B2 | 4/2003 | Amini | |
| 6,586,483 B2 | 7/2003 | Kolb et al. | |
| 6,750,448 B2 | 6/2004 | Turecek et al. | |
| 6,777,080 B2 | 8/2004 | Khandpur et al. | |
| 7,337,648 B2 | 3/2008 | Green | |
| 2006/0118191 A1* | 6/2006 | Rice | 138/99 |
| 2007/0014984 A1 | 1/2007 | Stout et al. | |

FOREIGN PATENT DOCUMENTS

| | | |
|---|---|---|
| DE | 33 35 728 A1 | 4/1985 |
| EP | 0 189 145 | 7/1986 |
| EP | 0 532 391 A | 3/1993 |
| FR | 2 231 916 A | 12/1974 |
| FR | 2 728 494 | 6/1996 |
| JP | 07-256775 | 10/1995 |
| JP | 11-291369 | 10/1999 |

\* cited by examiner

*Primary Examiner* — Victor Chang

(74) *Attorney, Agent, or Firm* — Dorsey & Whitney LLP; David E. Bruhn, Esq.

(57) ABSTRACT

A multi-layered composite includes a polymer adhesive layer and a polymer support film layer that becomes intimately incorporated with the polymer adhesive layer upon application of heat.

19 Claims, 4 Drawing Sheets

MULTI-LAYERED COMPOSITE SYSTEM AND METHOD

CROSS REFERENCE TO RELATED APPLICATIONS

This application is a continuation-in-part application and claims priority to U.S. application Ser. No. 11/829,374, now U.S. Pat. No. 8,057,895 filed on Jul. 27, 2007, which claims priority to PCT/US2006/003387, filed on Jan. 31, 2006, which claims priority to U.S. Application No. 60/648,573, filed on Jan. 31, 2005, all of which are incorporated herein by reference in their entirety.

BACKGROUND OF THE INVENTION

Various circumstances require repair of plastic, i.e., polyethylene piping, tanks, or vessels. Repair or connection can be affected by applying an adhesive or composite directly to the crack in the pipe, tank, or vessel. Alternatively, a multipart sleeve can be placed over the defect or pipe connection and sealed about it. Still another alternative when a pipe is damaged is to cut out the damaged area and replace it with a new section of piping. Yet another alternative is to "fusion weld" the plastic piping together as is known in the art. Regarding tanks and vessels, defects are typically repaired using "classical" patching methods such as epoxy or resin applied to a glass or other fiber/mesh to form a composite.

The afore-mentioned methods have several disadvantages. For example, application of an adhesive or composite to a crack tends to not provide a uniform seal. Also, the application may involve an extended "cure" time in which pressure exerted within the pipe may force the material out of the crack. For example, cure times can range from 2-3 hours to 1-7 days for full cure.

With regard to application of a multipart sleeve to the damaged area, this may often involve significant labor to excavate the area about the pipe so that the sleeve can be placed around the damaged area.

Cutting of the pipe to undertake repairs is often not desirable, especially when the pipe contains a liquid, such as oil or water, or a flammable gas. The operator would need to shut off the liquid or gas and purge the pipe to avoid contamination of the liquid or risk a gas explosion. This is generally not acceptable for most applications. Additionally, as mentioned above, excavation about the section to be replaced would be required. This can prove to be quite costly, both in terms of time as well as other financial resources.

Welding, including fusion welding, can also be problematic. If the pipe contains or contained a flammable substance, the arc, spark, open flame and/or relatively high temperatures typically involved in welding could ignite the material. Again, excavation about a large area might be required to access the repair site and can be costly.

With regard to the repair of damaged tanks or vessels, specifically, the defects are often overlaid with materials to match the original substrate, or, if the damage is too great they must be replaced. If the defects are overlaid with substrate matching materials, the overlaid areas are typically only thermally welded around the perimeter and do not provide the strength of the original tank or vessel. Additionally, there are no current effective adhesive methods to repair defects in polyolefins. For example, current patching methods for defects in polyolefins will often fail to adhere to the surface of the tank or vessel, or will be patched using dissimilar patching materials that can be problematic.

Thus, there exists a need to provide an improved system and method to repair plastic piping, tanks, or vessels.

SUMMARY

The present invention provides new composites and new methods to use these composites to repair and/or connect pieces of plastic piping, holding tanks, bulkheads, plastic vessels and the like, that overcome one or more of the disadvantages that are current in the art.

Generally, the composites and methods of the present disclosure may improve the strength of the bond, the curing rate, the ease of application, and the time required for application.

In one embodiment, the present invention provides a multi-layer patch (MLP) that includes at least a first and second layer. The first layer is a polymer adhesive; this includes gels formed from dissolved polymers, solvent swollen polymer films, or solvent saturated polymer foams. The second layer is a support film, or backing layer, that becomes intimately incorporated with the first polymer adhesive layer upon application of heat.

In some embodiments, the present invention provides a composite comprising three or, optionally, four layers when an envelope packaging configuration is desired. One layer, for example the bottom, outermost layer in contact with the pipe to be repaired, can be comprised of a suitable film that is intimately incorporated into the polymer adhesive layer, and ultimately into the bond after curing. Another layer, for example the top, outermost layer can comprise a suitable material (e.g., a film) that when combined with the bottom, outermost layer forms a protective envelope for the patch assembly.

In some embodiments, both the top, outermost and bottom, outermost layers become incorporated into the polymer adhesive layer during curing, and ultimately become part of the bond. In some embodiments, only the bottom layer becomes incorporated into the polymer adhesive layer; the top layer is of a material or a thickness such that it is not completely incorporated into the polymer adhesive layer, but actually results in a bonded substrate after the curing process. In some embodiments, the top layer can be a reinforced plastic. The reinforcing material included in the top layer can, for example, be an ultrahigh molecular weight polyethylene, such as Spectra® brand, or a polyaramid fiber, such as Kevlar® brand, or any other appropriate reinforcing material. In some embodiments, the polymer adhesive layer could include suitable reinforcing materials; these materials could be randomly arranged individual fibers, a layer of continuous fibers (i.e., a sheet), a fiber mesh, or they could comprise a distinct layer of either continuous fibers or a woven or non-woven fiber, or metal wires or mesh. In one embodiment, the reinforcing materials may further include a coating, such as for example, a polytetrafluoroethylene coating (e.g., Teflon®).

In some embodiments a metal layer, e.g., a thin film, mesh, or sputtercoated film, is applied or deposited on the surface of the adhesive layer polymer to act as a susceptor for radio frequency to absorb electromagnetic energy. The bond interface is thus preferentially heated by using the susceptor—radio frequency combination.

Generally, the polymer adhesive layer is a combination of a polyolefin, a polyamide, a polyester, a polyvinyl chloride (PVC) or a poly-acrylonitrile-butadiene-styrene (ABS) and a solvent. Various molecular weights of the polymer adhesives are contemplated within the scope of the invention.

Suitable solvents may include those that will dissolve a portion of the polymer, or saturate a polymer foam, such that the polymer is present in the gel, or foam, from between about 2 to about 60% by weight. Other suitable solvents include those that will swell the polymer such that the polymer is present in the swollen film from between about 15 to about 60% by weight. Depending on the polymer chosen, suitable solvents may include tetralin, decalin, tetrachloroethylene, tetrachloroethane, xylene, cyclohexane, diethylether, dichloromethane, methylene chloride, methyl ethyl ketone, tetrahydrofuran, benzene, toluene, 1-chloronaphthalene, cyclohexanone, m-cresol, ethylcyclohexane, heptane, nonane, and/or 1,2,4-trichlorobenzene. Alternatively, any similar solvents, as are known in the art, may be employed.

Generally, the second support film layer is a polyolefin, a polyamide, a polyester, a PVC or an ABS. Various molecular weights of the support film polymer layer are contemplated within the scope of the invention.

The MLP can further include a third layer that acts as a barrier or release film, which is in contact with the polymer adhesive layer. In one aspect the third layer is of a type that can be intimately incorporated into the first polymer adhesive layer upon application of heat. Suitable films include polyolefins, polyamides, polyesters, polyvinyl chloride (PVC), poly-acrylonitrile-butadiene-styrene (ABS), polyketone, fluoropolymer, polyurethane or combinations thereof. Various molecular weights of the polymers composing the film layers are contemplated within the scope of the invention. In another aspect the third layer is a release material and can be a film, a coating or a powder.

A solvent containing ampoule is used in some embodiments to deliver solvent to the MLP assembly just prior to the application of the MLP to the repair site. The ampoule may be solvent resistant and integrated into the MLP so that the ampoule can be broken inside the assembly and allow the solvent to saturate the foam polymer adhesive layer prior to applying the patch. Alternatively, a solvent connection/injection port, whereby solvent can be delivered into the MLP assembly just prior to application, may be integrated into the MLP.

The MLP of the present disclosure can be applied to, for example, plastic piping in order to facilitate connection of ends or the repair of breaks, holes, cracks, fissures, gouges, scrapes, and the like in the piping. Alternatively, the MLP of the present disclosure can be applied to any polymer repair application, such as for example, polymer tanks and vessels. Further, the MLP of the present disclosure can be used to bond garment fabrics to high strength polymeric materials.

The MLPs of the invention provide certain advantages over current repair/adhesive techniques. For example, a uniform seal is achieved with the composites of the invention. The materials have enough integrity that they do not seep into the crack, for example, and lose strength over time.

DETAILED DESCRIPTION

The present invention provides new MLPs and methods to use the new MLPs on polymer repair applications and/or adhesion applications that overcome one or more of the disadvantages that are current in the art. For example, the MLPs may be used to connect, repair, or reinforce plastic piping or to repair a defect in a tank or vessel. As a further example, the MLPs may be used to bond garment fabrics to high strength polymeric materials.

Figure 1:
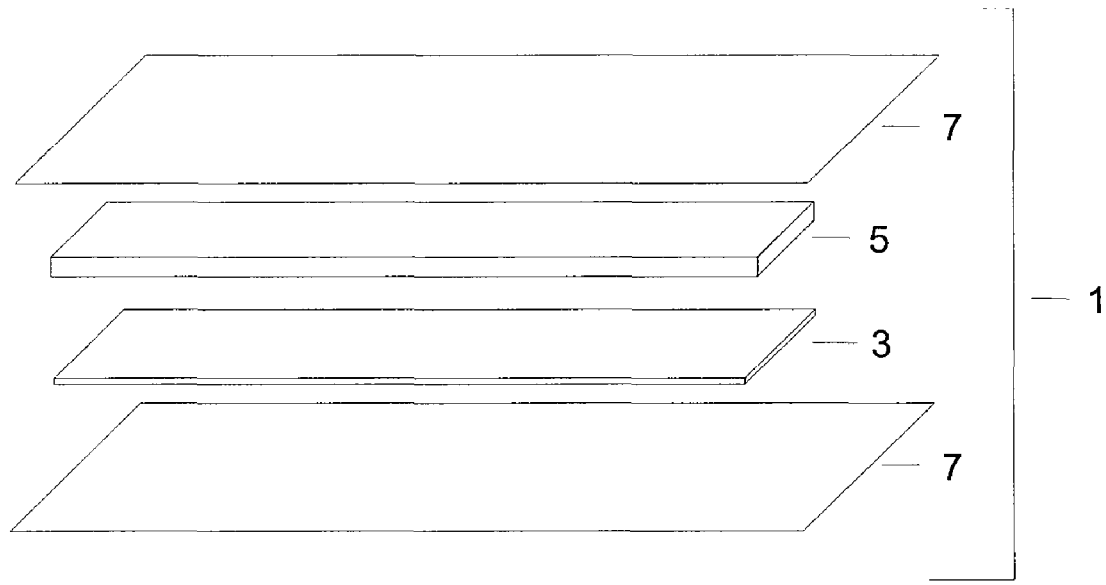
FIGS. 1, 1A, and 1B depict one aspect of an MLP of the present disclosure with and without the optional release or envelope barrier films.
Figure 1A:
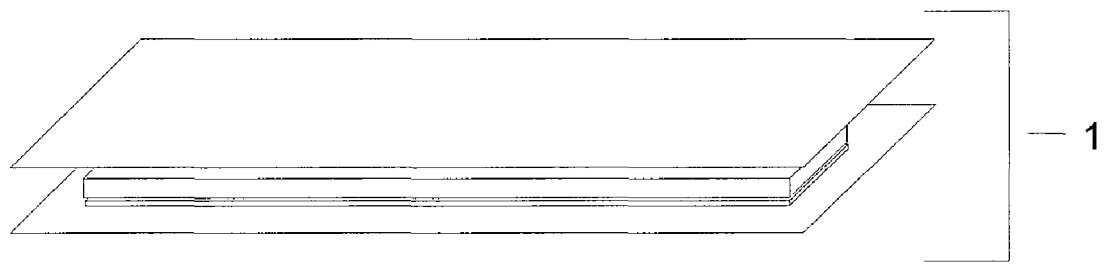
Figure 1B:

FIGS. 1, 1A, and 1B depict one aspect of the present invention providing a MLP 1 that includes at least a first 3 and second layer 5 with the optional third and/or fourth layers 7. The first layer 3 is a polymer adhesive layer. The second layer 5 is a support film or thicker substrate (backing layer) whose surface becomes intimately incorporated with the first polymer adhesive layer upon application of heat. The optional third and/or fourth layer(s) 7 can either be release films or envelope barrier films.

The phrase "intimately incorporated" is intended to mean that upon physical exertion, such as heating of the first layer 3 and second layer 5 against a substrate (not shown), the solvent remaining in the first polymer adhesive layer 3 will cause the support film 5 to become homogeneously or heterogeneously incorporated with the other layer(s). Not to be limited by theory, the stressing of the two layers effectively causes the two layers to become a single layer. Temperatures used to accomplish this may be from about 5 to 90° C. below the softening/melting point of the virgin polymer (i.e., no solvent present). Table 1 provides an exemplary list of polymer-solvent pairs, including either the melting or glass transition temperatures of the virgin polymers as well as the melting or glass transition temperatures of the polymer-solvent pairs. For example, from Table 1, it is seen that an ultra high molecular weight polyethylene polymer adhesive based MLP may be heated to about 80 to about 120° C. when connecting or repairing a polyethylene substrate, depending on the solvent used. It is to be understood that Table 1 is an exemplary list of polymer-solvent pairs and in no way limits the scope of the present disclosure.

TABLE 1

| Polymer | Solvent | Virgin* Tg (° C.) | Virgin* Tm (° C.) | Solvent** Tg (° C.) | Solvent** Tm (° C.) |
|---|---|---|---|---|---|
| Polypropylene | Benzene | — | 168 | — | N/A |
| | Cyclohexane | — | | — | N/A |
| | Decalin | — | | — | 163 |
| | Tetralin | — | | — | 104 |
| | Toluene | — | | — | 97 |
| | 1-Chloronaphthalene | — | | — | 137 |
| Polyvinyl Chloride | Cyclohexanone | 82 | — | 60 | — |
| | Tetrahydrofuran | — | | 53 | — |
| ABS | Toluene | 105 | — | 84 | — |
| Nylon 12 | m-Cresol | — | 187 | — | 100 |
| Polybutylene | Benzene | — | 125 | — | 127 |
| | Ethylcyclohexane | — | | — | 125 |
| | Decalin | — | | — | 102 |
| | Heptane | — | | — | 127 |
| | Nonane | — | | — | 128 |
| | 1,2,4-Trichlorobenzene | — | | — | 105 |
| Polyethylene (MDPE) | 1-Chloronaphthalene | — | 127 | — | 116 |
| | Decalin | — | | — | 120 |
| | Tetralin | — | | — | 104 |
| | 1,2,4-Trichlorobenzene | — | | — | 112 |
| | Xylene | — | | — | 79 |

Term Meaning:
Virgin*—Only polymer material present in pan
Solvent**—Polymer and solvent present in pan In some embodiments, the polymer adhesive layer and/or film layers are incorporated into a bond layer (along with the surface of the substrate being repaired) when the adhesion process is complete.

Generally, the first layer, or polymer adhesive layer 3, may be a polyolefin, a polyamide, a polyester, a PVC, an ABS, or combinations thereof, and a solvent. Various molecular weights of the polymer adhesive layer are contemplated within the scope of the invention. Additionally, if the polymer is polyethylene, it may have low, medium or high density, such as a low density (LDPE), medium density (MDPE), high density (HDPE), very high molecular weight (VHMWPE), or ultra high molecular weight polyethylene (UHMWPE).

Suitable solvents include those that will dissolve a weight percentage of the polymer such that the polymer is present in the polymer adhesive layer 3 from between about 2 and about 60% by weight. For example, useful solvents to solvate or infuse an adhesive layer 3 comprising a polymer may include tetralin, decalin, tetrachloroethylene, tetrachloroethane, xylene, cyclohexane, diethylether, dichloromethane, methylene chloride, methyl ethyl ketone, tetrahydrofuran, benzene, toluene, 1-chloronaphthalene, cyclohexanone, m-cresol, ethylcyclohexane, heptane, nonane, and/or 1,2,4-trichlorobenzene, and similar solvents, as are known in the art.

In some embodiments, adhesive layer 3 may comprise a gel. In the gel formation process, a predetermined amount of polymer (powder, prills, pellets, etc.) is typically placed into the solvent and heated for about 30 minutes to 12 hours with some form of agitation. In the case of polyethylene, the solution is heated between about 100° C. to about 145° C. for up to a few hours. The resulting solution is cooled and becomes a gel. Before or during the cooling process, the viscous solution is poured onto a non-stick surface and pressed flat so that a gel forms that is between about 0.5 and about 6 mm thick.

In another embodiment, adhesive layer 3 may comprise a swollen polymer film. A piece of polymer film is cut to the desired size (the film swells approximately 40-60% in each direction). In the case of polyethylene, the polyethylene can be low (LDPE), medium (MDPE), high density (HDPE), very high molecular weight (VHMWPE), or ultra high molecular weight (UHMWPE). The polymer film is placed in a hot solvent bath at from about 95 to about 115° C. and allowed to swell for the desired time (to achieve a 15-60 weight percent (wt %) swollen polymer film). The swollen film is then removed, chilled, and stored for later use.

In a further embodiment, adhesive layer 3 may comprise a polymer foam. The foam may be soaked in, and saturated with, the desired solvent to be used for adhesive layer 3 of the MLP. Polymer foams may comprise, for example, a polyolefin, a polyamide, a polyester, a polyvinyl chloride, a poly-acrylonitrile-butadiene-styrene, or combinations thereof. Use of polymer foam may be advantageous because saturation of the foam with the desired solvent may be carried out at room temperature. Suitable solvents for combining with polymer foams may include, tetralin, decalin, tetrachloroethylene, tetrachloroethane, xylene, cyclohexane, diethylether, dichloromethane, methylene chloride, methyl ethyl ketone, tetrahydrofuran, benzene, toluene, 1-chloronaphthalene, cyclohexanone, m-cresol, ethylcyclohexane, heptane, nonane, and/or 1,2,4-trichlorobenzene, and similar solvents, as are known in the art.

Generally, the second layer, or support film layer 5, is a polyolefin, a polyamide, a polyester, a PVC or an ABS. Various molecular weights of the polymers of this support film (backing layer) are contemplated within the scope of the invention. In some embodiments, the support film layer 5 can be a fiber reinforced plastic. Typically, the support film layer 5 is selected so that it is compatible with the polymer adhesive layer 3 and/or the polymer repair/adhesion application to which it will be applied.

In one aspect, the MLP 1 may further include one or more outer layers 7. Outer layers may comprise a release material and can be a film, a coating, or a powder, such as those known in the art. If a release coating or powder is used, the amount is minimal and does not substantially affect the physical properties of the polymer adhesive layer 3. In one embodiment, outer layers 7 may be films comprising at least one of a polyolefin, a polyamide, polyimide, a polyester, a polyvinyl chloride, a poly-acrylonitrile-butadiene-styrene or combinations thereof.

In another aspect, the one or more outer layers 7 are a protective envelope barrier films. The outer layer(s) 7 may be applied to the adhesive layer 3 only, or to the entire adhesive-support film composite, such that the outer layer(s) 7 at least partially surrounds a portion of the adhesive layer 3 and support film 5. The envelope barrier film may be thought of as a packet, bag, or baggie, or surrounding structure which may be open on one or more sides. Thin envelope barrier films that are compatible with the other polymers of the MLP and the substrate can be incorporated into the final MLP-repaired substrate bond.

Figure 2:
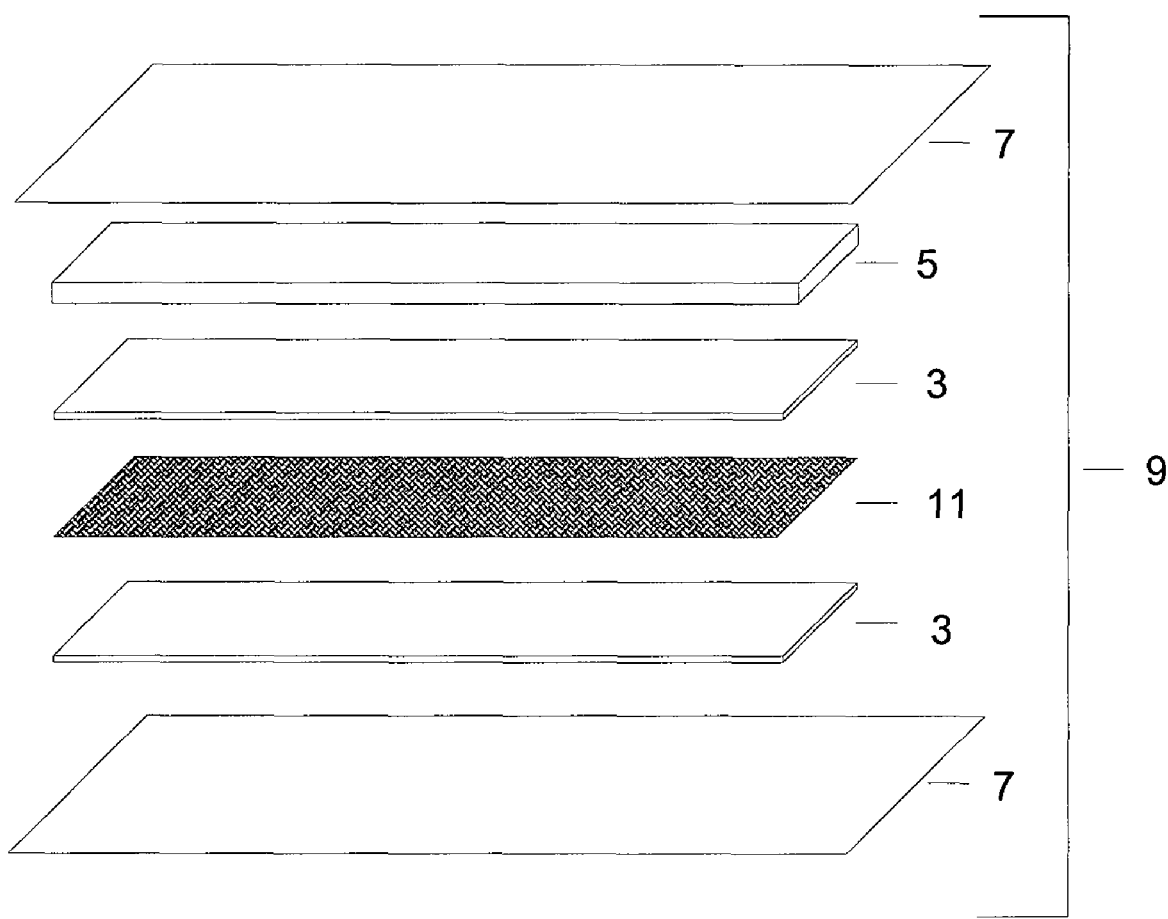
FIG. 2 depicts another aspect of the invention including a fiber or metal reinforced MLP.

FIG. 2 depicts an embodiment of a MLP 9. MLP 9 may include a first layer comprising a polymer adhesive layer 3 that includes a reinforcing material 11, such as fibers, cloth mesh, metal wires or mesh, polymer mesh, or wire traces. Suitable reinforcing materials 11 may further include a polyethylene, a polyester, a nylon, or a polyaramide fiber, such as Kevlar® brand, available from E.I. du Pont de Nemours and Company (Wilmington, Del.). In one embodiment, reinforcing material 11 may be selected such that the reinforcing material 11 does not dissolve in the polymer adhesive layer 3. For example, a high modulus polyethylene fiber can be used and is commercially available from Honeywell, USA, (Morristown, N.J.) and is known as Spectra® brand fiber. In one embodiment, reinforcing material 11 may be further used as a heating element.

In some embodiments, the second layer 5, as in FIG. 1, may comprise a support film or backing layer that can be intimately incorporated with the first polymer adhesive layer 3 upon application of heat. The MLP 9 can also include optional outer layer(s) 7. Second layer 5 and/or optional outer layer(s) 7 may be substantially similar to the same components described with reference to FIG. 1. For purposes of illustration, FIG. 2 depicts the reinforced polymer adhesive layer 3 separated into three components. It is to be understood, however, that reinforcing material 11 may be incorporated/embedded within the polymer adhesive layer 3 such that the adhesive layer 3 comprises a unitary structure.

In one embodiment, the reinforcing material 11 can be incorporated into the polymer adhesive 3 by adding the reinforcing material 11 to the viscous gel material while the gel is curing, e.g., cooling.

Figure 3:
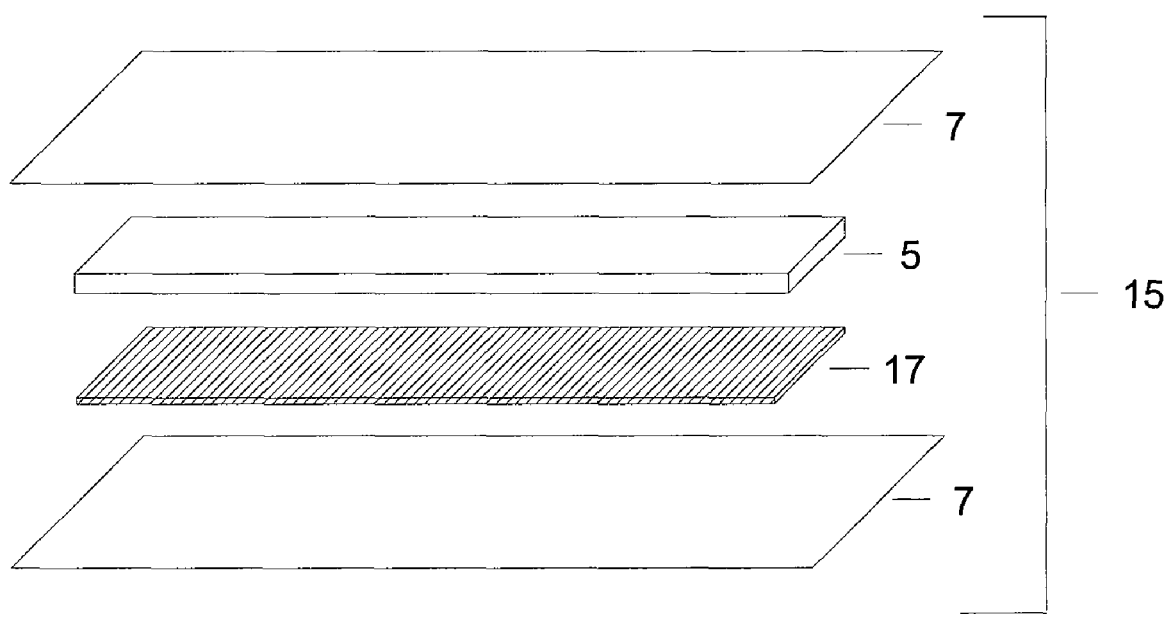
FIG. 3 depicts another aspect of the invention including an internally, heated MLP.

FIG. 3 depicts another aspect of the present invention providing a MLP 15 that includes at least a first heated layer 17 and second layer 5 with the optional outer layer(s) 7. In some embodiments, heated layer 17 can be used as a combination reinforcing material and heat source. In one embodiment, heated layer 17 may comprise a metal wire mesh or wire traces, which can be used as a heated grid to fuse the support film/backing layer 5 to the substrate. For example, opposite edges of a wire mesh may be connected to an electrical power source such that the wire mesh can be used as a resistance heated grid, which in turn, can be used to bring the interface of the support film or backing layer 5 and the substrate to their melting temperature. In further embodiments, heated layer 17 may comprise a susceptor comprised of, for example, a thin mesh, film, or metallic coating layer, which can be used to heat the bond interface by the application of radio frequency (RF) energy to the MLP. The combination of the melted surfaces and an applied squeezing force may cause the two materials to bond and form one continuous layer with the heated layer 17 being embedded in this bond.

In some embodiments, MLP 15 may further include a polymer adhesive layer, such as those described in previous embodiments. For example, in one embodiment, the heating layer 17 may be applied directly to a polymer adhesive layer.

In further embodiments, MLP 15 may include an adhesive layer comprising a solvent swollen polymer film or solvent saturated polymer foam with wire mesh or wire traces 17, where the wire mesh or wire traces can be used to heat the swollen film to cure the support film 5—substrate bond interface. Such resistance wires may be attached to the surface of the film by, for example, stitching. Alternatively, the resistance wires may be molded into the film layer during the film manufacturing process or be sandwiched between two layers of film. In some embodiments, the polymer film choice may depend on the materials being bonded. For example polyethylene substrate connections or repairs would be paired with the appropriate polymer film such as low (LDPE), medium (MDPE), high density (HDPE), very high molecular weight (VHMWPE), or ultra high molecular weight polyethylene (UHMWPE). As a further example, a non-swollen film with the same type of resistance wires may be used to melt and fuse the support film 5 and substrate material.

In some embodiments, a solvent containing ampoule may be used to deliver solvent to the MLP assembly prior to the application of the MLP to the repair site. For example, the ampoule may be solvent resistant and integrated into the MLP such that the ampoule can be broken inside the assembly and accommodate solvent saturation of the foam polymer adhesive layer prior to applying the patch. In one embodiment, ampoules may be comprised of nylon, a fluoropolymer, and the like.

In further embodiments, solvent delivery may be accomplished by means of a solvent connection/injection port integrated into the MLP. In such embodiments, just prior to application, solvent can be delivered into the MLP via the solvent injection port.

MLPs 1, 9 and/or 15 may be applied to a plastic pipe with a Clamp and Repair Tool as described in U.S. Pat. No. 7,337,648, entitled "Clamp and Repair Tool" by Kenneth H. Green, issued on Mar. 4, 2008, the contents of which are incorporated herein by reference in their entirety. For example, MLPs 1, 9 and/or 15 may be placed in the jaws of the clamp and contacted with the plastic pipe surface. Pressure and heat are applied from the clamp to accomplish the connection or repair.

MLPs 1, 9, and/or 15 provide an advantage over other adhesive systems. First, they are easy to handle since there is no free flowing solvent present. Second, if the MLP 1 or 9 includes outer layer(s) 7 then the resultant barrier film envelope can be hermetically sealed so that outgassing of the solvent is not noticeable. Third, MLP 15 allows for the connection or repair to be conducted during low temperature conditions, where surface heating would not be adequate to provide the proper bond interface temperatures.

Figure 4:
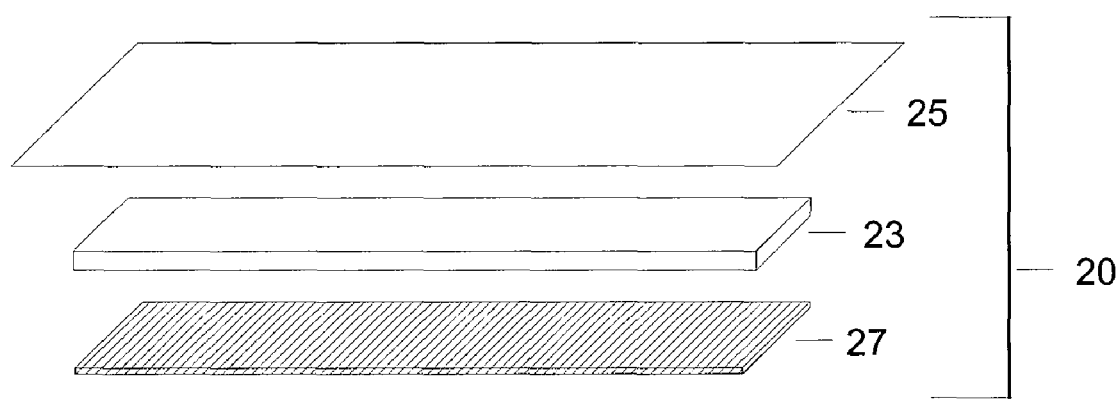
FIG. 4 depicts a further aspect of an MLP of the present disclosure.

FIG. 4 depicts a MLP 20 in accordance with an alternative aspect of the present disclosure. Generally, MLP 20 may comprise a multilayer composite material that provides the benefits of both a garment fabric and a high strength polymer. In some embodiments, MLP 20 may include a polymer adhesive layer 23, garment fabric layer 25, and high strength polymeric material layer 27. Polymer adhesive layer 23 may be comprised of a polyolefin, a polyamide, a polyester, a PVC, an ABS, or combinations thereof, and a solvent. Polymer adhesive layer 23 may be in the form of a polymer gel, swollen film, or foam. Garment fabric layer 25 may comprise any garment fabric, such as for example, cotton, wool, denim, and the like. Alternatively, fabric layer 25 may comprise any natural or synthetic fabric. High strength polymeric material layer 27 may include, for example, Spectra® brand meshes or mats.

In some embodiments, bonds between the garment fabric layer 25 and the high strength polymer material layer 27 may be achieved by applying heat to two or more layers of these materials interspersed with polymer adhesive 23. By heating the layers, the dissimilar materials may be permanently bonded into a superior fabric composite. Advantages of the fabric composite include, but are not limited to, the natural wicking action of cotton and the thermal benefits of wool combined with the strength and cut and penetration resistance of high strength polymers.

Example Preparation Methods

Gel

Polyethylene is weighed out to produce 6 wt %, 8 wt %, or 10 wt % (% polymer) gels. 50 ml of gel at a time are generally produced at a time, so 3, 4, or 5 grams of polyethylene are weighed out and placed in a 100 ml round-bottom flask respectively. The polyethylene can be low (LDPE), medium (MDPE), high density (HDPE), or ultrahigh molecular weight (UHMWPE).

Decalin is added to the flask to produce 50 grams of total gel. This is the weight of the polyethylene and decalin combined.

An oil bath is heated to, and maintained at, 145° C. The oil bath sits on top of a stir plate. A stir bar is placed in the round bottom flask and is stirred during the process.

The decalin/polyethylene mixture is maintained at 145° C. for 2 hours, and is then allowed to cool.

The gel is labeled and stored until it is time to make a gel film.

When it is time to make the gel film a small amount of gel is placed in a 50 ml round bottom flask and heated to 145° C.

Once the gel reaches temperature, it is poured onto a mold and pressed flat. The resulting gel film is allowed to cool for about 20 minutes.

A piece of polyethylene film to be used as an envelope is placed flat on the work area. The film used in the tests summarized below is commonly available LDPE "plastic wrap" that can be purchased at grocery stores. Other densities of polyethylene can be used. The piece of film should be large enough to completely cover the top and bottom of the preformed gel layer, plus enough margin to allow the edges to be sealed.

The preformed polyethylene gel is slid from the mold onto the plastic wrap. The plastic wrap is folded over, so the gel is completely covered with one layer of plastic wrap. The resulting barrier film envelope consists of a single layer of LDPE film upon which a layer of gel sits; with another layer of LDPE film covering the top of the gel. The LDPE film is pressed close around the three open edges.

Example Gel Lap-Shear Test Methods and Results

The prepared gel is placed between two layers of polyethylene substrate to be adhered. The substrate "sandwich" is placed in a frame to provide proper alignment during the curing process.

The frame and lap-shear samples are placed into a preheated press. Example test temperatures were between about 105 and about 120° C. The range of applied pressures was from about 5 to about 50 psi. The bond formation process takes a minimum of about 20 minutes at the set temperature. The lap-shear sample is allowed to cool to room temperature before testing. Representative examples are provided in Table 2.

Generally, HDPE substrates were bonded using the gel adhesive in a heated platen equipped Carver press with test sample thicknesses, pressures, and temperatures varied. The samples were prepared using a modified version of the ASTM standards D3163, D3165, and D5868. For the results shown in Table 2, the modified parameters were: overlap=0.5" square inches (1" wide×0.5" long), pull rate=0.5"/min, substrate thickness=3/16", 3/16" Backers are glued to the back of the substrate to keep samples in shear, as provided by the ASTM standard. The substrate sheets were cut into pieces for overlap shear tests according to ASTM standards. The substrate pieces that were used for the lap-shear tests were 4.5"× 1"×3/16". Spacers were 4"×1"×3/16", and doublers were 3.5"× 1"×3/16".

TABLE 2

| Substrate | Gel Polymer | Gel Solvent | Film Material | Gel Weight Percent | Patch Thickness | Cure Temperature (° C.) | Cure Time (hours) | Pressure (gauge) (PSIG) | Failure Mode | Comments | Shear Strength |
|---|---|---|---|---|---|---|---|---|---|---|---|
| HDPE | HDPE | Decalin | LDPE | 6 | 0.81 | 110 | 1.5 | 40 | Cohesive | | 512 |
| HDPE | HDPE | Decalin | LDPE | 6 | 0.81 | 110 | 1.5 | 40 | Cohesive | | 572 |
| HDPE | HDPE | Decalin | LDPE | 8 | 1 | 115 | 1.5 | 30 | Cohesive | | 812 |
| HDPE | HDPE | Decalin | LDPE | 8 | 1 | 115 | 1.5 | 30 | Cohesive | | 502 |
| HDPE | HDPE | Decalin | LDPE | 8 | 1 | 115 | 1.5 | 30 | Cohesive | | 492 |
| HDPE | HDPE | Decalin | LDPE | 6 | 1.19 | 120 | 1.5 | 20 | Cohesive | | 816 |
| HDPE | HDPE | Decalin | LDPE | 6 | 1.19 | 120 | 1.5 | 20 | Cohesive | | 744 |
| HDPE | HDPE | Decalin | LDPE | 6 | 1.19 | 120 | 1.5 | 20 | Cohesive | | 794 |
| HDPE | HDPE | Decalin | LDPE | 10 | 0.81 | 120 | 1.5 | 40 | Cohesive | | 853 |
| HDPE | HDPE | Decalin | LDPE | 10 | 0.81 | 120 | 1.5 | 40 | Cohesive | | 689 |
| HDPE | HDPE | Decalin | LDPE | 8 | 0.81 | 120 | 1.5 | 40 | Cohesive | | 629 |
| HDPE | HDPE | Decalin | LDPE | 8 | 0.81 | 110 | 1.5 | 40 | Cohesive | | 629 |
| HDPE | HDPE | Decalin | LDPE | 8 | 0.81 | 110 | 1.5 | 40 | Cohesive | | 502 |
| HDPE | HDPE | Decalin | LDPE | 8 | 0.66 | 115 | 1.5 | 30 | Cohesive | | 527 |
| HDPE | HDPE | Decalin | LDPE | 8 | 0.66 | 115 | 1.5 | 30 | Cohesive | | 520 |
| HDPE | HDPE | Decalin | LDPE | 10 | 1.19 | 110 | 1.5 | 20 | Cohesive | | 463 |
| HDPE | HDPE | Decalin | LDPE | 10 | 1.19 | 110 | 1.5 | 20 | Cohesive | | 323 |
| HDPE | HDPE | Decalin | LDPE | 10 | 0.81 | 120 | 1.5 | 20 | Cohesive | | 593 |
| HDPE | HDPE | Decalin | LDPE | 10 | 0.81 | 120 | 1.5 | 20 | Cohesive | | 566 |
| HDPE | HDPE | Decalin | LDPE | 10 | 1.19 | 110 | 1.5 | 40 | Cohesive | | 388 |
| HDPE | HDPE | Decalin | LDPE | 10 | 1.19 | 110 | 1.5 | 40 | Cohesive | | 489 |
| HDPE | HDPE | Decalin | LDPE | 8 | 1 | 115 | 1.5 | 30 | Cohesive | | 447 |
| HDPE | HDPE | Decalin | LDPE | 8 | 1 | 115 | 1.5 | 30 | Cohesive | | 541 |
| HDPE | HDPE | Decalin | LDPE | 8 | 1.34 | 115 | 1.5 | 30 | Cohesive | | 470 |
| HDPE | HDPE | Decalin | LDPE | 8 | 1.34 | 115 | 1.5 | 30 | Cohesive | | 527 |
| HDPE | HDPE | Decalin | LDPE | 8 | 1 | 115 | 1.5 | 46.8 | Cohesive | | 554 |
| HDPE | HDPE | Decalin | LDPE | 8 | 1 | 115 | 1.5 | 46.8 | Cohesive | | 425 |
| HDPE | HDPE | Decalin | LDPE | 6 | 0.81 | 110 | 1.5 | 20 | Cohesive | | 551 |
| HDPE | HDPE | Decalin | LDPE | 6 | 0.81 | 110 | 1.5 | 20 | Cohesive | | 503 |
| HDPE | HDPE | Decalin | LDPE | 6 | 1.19 | 120 | 1.5 | 40 | Cohesive | | 642 |
| HDPE | HDPE | Decalin | LDPE | 6 | 1.19 | 120 | 1.5 | 40 | Cohesive | | 702 |
| HDPE | HDPE | Decalin | LDPE | 8 | 1 | 123 | 1.5 | 30 | Cohesive | | 672 |
| HDPE | HDPE | Decalin | LDPE | 8 | 1 | 123 | 1.5 | 30 | Cohesive | | 698 |
| HDPE | HDPE | Decalin | LDPE | 8 | 1 | 106 | 1.5 | 30 | Cohesive | | 324 |
| HDPE | HDPE | Decalin | LDPE | 8 | 1 | 106 | 1.5 | 30 | Cohesive | | 314 |
| HDPE | HDPE | Decalin | LDPE | 11.4 | 1 | 115 | 1.5 | 30 | Cohesive | | 606 |
| HDPE | HDPE | Decalin | LDPE | 11.4 | 1 | 115 | 1.5 | 30 | Cohesive | | 674 |
| HDPE | HDPE | Decalin | LDPE | 4.6 | 1 | 115 | 1.5 | 30 | Cohesive | | 641 |
| HDPE | HDPE | Decalin | LDPE | 6 | 0.81 | 115 | 1.5 | 20 | Adhesive/Cohesive | Not enough gel | 474 |
| HDPE | HDPE | Decalin | LDPE | 8 | 0.81 | 115 | 1.5 | 20 | Cohesive | | 783 |
| HDPE | HDPE | Decalin | LDPE | 10 | 0.81 | 115 | 1.5 | 40 | Cohesive | | 759 |
| HDPE | HDPE | Decalin | LDPE | 6 | 0.81 | 115 | 1.5 | 40 | Cohesive | | 678 |
| HDPE | HDPE | Decalin | LDPE | 8 | 0.81 | 115 | 1.5 | 40 | Cohesive | | 631 |
| HDPE | HDPE | Decalin | LDPE | 8 | 1 | 120 | 1.5 | 30 | Cohesive | aged 1 week | 728 |
| HDPE | HDPE | Decalin | LDPE | 8 | 1 | 120 | 1.5 | 30 | Cohesive | aged 1 week | 638 |
| HDPE | HDPE | Decalin | LDPE | 8 | 1 | 120 | 1.5 | 30 | Cohesive | aged 2 weeks | 680 |
| HDPE | HDPE | Decalin | LDPE | 8 | 1 | 120 | 1.5 | 30 | Cohesive | aged 2 weeks | 669 |
| HDPE | HDPE | Decalin | LDPE | 8 | 1 | 120 | 1.5 | 30 | Cohesive | aged 4 weeks | 641 |
| HDPE | HDPE | Decalin | LDPE | 8 | 1 | 120 | 1.5 | 30 | Cohesive | aged 4 weeks | 629 |
| HDPE | HDPE | Decalin | LDPE (0.04") | 6 | 0.81 | 115 | 1.5 | 20 | Cohesive | | 725 |

HDPE = High density polyethylene (e.g., 3/16" HDPE sheeting from McMaster Carr.)
LDPE = Low density polyethylene (e.g., a Fred Meyer brand plastic wrap.)
Cure temperature is in degrees Celsius.
Cure Time is in hours.
Pressure refers to the gauge pressure on the Carver Press during cure.
"Failure Mode" is intended to encompass two basic failure modes recognized in adhesion science: adhesive failure, which means that the failure occurred in the boundary between the adhesive and the substrate, and cohesive failure, which means that the failure occurred either entirely in the substrate or entirely in the adhesive. The failures occurred entirely in the adhesive (except for the one sample without enough gel, in which the failure was both cohesive and adhesive).
Shear strength was determined using one of ASTM D3163, D3165, and D5868.

Example Preparation Methods

Polyethylene Swollen Film

A glass container/s containing decalin is inserted into the holding rack of the oil bath. The oil bath temperature is set to 101 to 105° C. (the temperature varies with the polyethylene film material) and the bath is allowed to equilibrate for about 1 hour. If the bath is already hot, but the decalin containers are not, at least 30 minutes is allowed for the decalin in these containers to reach the bath's set point temperature. The hot decalin temperature in each container is measured prior to the start of each batch of film samples.

A piece of film of desired size is cut (the film samples will swell ~50-60% in all directions). The polyethylene can be low (LDPE), medium (MDPE), high density (HDPE), very high molecular weight (VHMWPE), or ultra high molecular weight (UHMWPE).

The film is placed into the hot glass decalin container, making sure the film is fully submerged into the hot decalin. The hot decalin temperature in each container is measured and documented prior to the start of each batch of film samples.

The film is allowed to swell for the desired time period (a baseline of 40 minutes for 20 wt % using 0.020" UHMWPE film). Weight percent is based on polymer content.

The frame and lap-shear samples are placed into a preheated press. In order to simulate field conditions some lap-shear samples are made without preheating the press platens. Example test temperatures were between 110 and 120° C. The range of applied pressures was 5 to 50 psi. The bond formation process takes a minimum of about 20 minutes at the set temperature. The lap-shear sample is allowed to cool to room temperature before testing. Representative examples are provided in Table 3.

Generally, HDPE substrates were bonded using the swollen film adhesive in a heated platen equipped Carver press with test sample thicknesses, pressures, and temperatures varied. The samples were prepared using a modified version of the ASTM standards D3163, D3165, and D5868. For the results shown in Table 2, the modified parameters were: overlap=0.5 square inches (1" wide×0.5"long), pull rate=1"/min, substrate thickness=3/8". The substrate sheets were cut into pieces for overlap shear tests according to ASTM standards. The substrate pieces that were used for the lap-shear tests were 4"×1"×3/8".

TABLE 3

| Substrate | Swollen Film | Film Solvent | Film Material | Film Weight Percent | Cure Temperature (° C.) | Cure Time (hours) | Pressure (gauge) (PSIG) | Failure Mode | Comments | Shear Strength |
|---|---|---|---|---|---|---|---|---|---|---|
| HDPE | UHMWPE | Decalin | none | 60 | 121 | 90 | 20 | Adhesive | | 650 |
| HDPE | UHMWPE | Decalin | none | 60 | 121 | 90 | 20 | Adhesive | | 675 |
| HDPE | UHMWPE | Decalin | none | 60 | 121 | 90 | 20 | Adhesive | | 450 |
| HDPE | UHMWPE | Decalin | none | 40 | 121 | 90 | 20 | A-C | | 890 |
| HDPE | UHMWPE | Decalin | none | 40 | 121 | 90 | 20 | A-C | | 820 |
| HDPE | UHMWPE | Decalin | none | 40 | 121 | 90 | 20 | A-C | | 680 |
| HDPE | UHMWPE | Decalin | none | 20 | 121 | 90 | 20 | Cohesive | | 1300 |
| HDPE | UHMWPE | Decalin | none | 20 | 121 | 90 | 20 | Cohesive | | 1520 |
| HDPE | UHMWPE | Decalin | none | 20 | 121 | 90 | 20 | Cohesive | | 1280 |
| HDPE | HDPE | Decalin | none | 75 | 121 | 90 | 20 | Adhesive | Pretest fail | 0 |
| HDPE | HDPE | Decalin | none | 75 | 121 | 90 | 20 | Adhesive | | 375 |
| HDPE | HDPE | Decalin | none | 75 | 121 | 90 | 20 | Adhesive | | 440 |
| HDPE | HDPE | Decalin | none | 60 | 121 | 90 | 20 | Adhesive | | 430 |
| HDPE | HDPE | Decalin | none | 60 | 121 | 90 | 20 | Adhesive | | 460 |
| HDPE | HDPE | Decalin | none | 60 | 121 | 90 | 20 | Cohesive | | 600 |
| HDPE | HDPE | Decalin | none | 40 | 121 | 90 | 20 | A-C | | 860 |
| HDPE | HDPE | Decalin | none | 40 | 121 | 90 | 20 | A-C | | 960 |
| HDPE | HDPE | Decalin | none | 40 | 121 | 90 | 20 | A-C | | 780 |
| HDPE | HDPE | Decalin | none | 20 | 121 | 90 | 20 | Cohesive | | 1240 |
| HDPE | HDPE | Decalin | none | 20 | 121 | 90 | 20 | Cohesive | | 1390 |
| HDPE | HDPE | Decalin | none | 20 | 121 | 90 | 20 | Cohesive | | 1240 |
| HDPE | HDPE | Decalin | none | 30 | 121 | 90 | 20 | Adhesive | | 500 |
| HDPE | HDPE | Decalin | none | 30 | 121 | 90 | 20 | Adhesive | | 1020 |
| HDPE | HDPE | Decalin | none | 30 | 121 | 90 | 20 | Adhesive | | 550 |

Once the desired swelling time is reached, the film is removed from the hot decalin with tweezers and plunged directly into a bottle of clean decalin that was kept in the freezer. The freezer bottle (with sample) is placed back into the freezer for at least 5 minutes.

Using tweezers, the chilled film sample is removed from the freezer bottle and placed into a closeable glass container or folded into LDPE or aluminum foil envelope and labeled.

Example Polyethylene Swollen Film Shear Test Methods and Results

The prepared swollen film is placed between two layers of polyethylene substrate to be adhered. The substrate "sandwich" is placed in a frame to provide proper alignment during the curing process.

Although the present invention has been described with reference to preferred embodiments, persons skilled in the art will recognize that changes may be made in form and detail without departing from the spirit and scope of the invention.

What is claimed is:

1. A multi-layered patch comprising:
   a backing layer comprising polyethylene;
   a first polymer adhesive layer comprising a combination of polyethylene foam and solvent at room temperature;
   a heating layer comprising a polymer mesh and a heating element;
   a second polymer adhesive layer comprising a combination of polyethylene foam and solvent at room temperature; and
   an outer layer comprising polyethylene, wherein at least the backing layer becomes heterogeneously or homogenously incorporated with the first polymer adhesive layer upon application of heat.

2. The multi-layer patch of claim 1, further comprising an ampoule in the first or second polymer adhesive layer.

3. The multi-layer patch of claim , further comprising a solvent injection port.

4. The multi-layer patch of claim 1, wherein the heating element is metal wire, metal mesh or wire traces.

5. The multi-layer patch of claim 1, wherein the heating element is attached to the heating layer by stitching.

6. The multi-layer patch of claim 1, wherein the polymer mesh comprises polyethylene.

7. The multi-layer patch of claim 1, wherein the solvent in the first polymer adhesive layer or the second polymer adhesive layer is decalin, tetralin, tetrachloroethylene, tetrachloroethane, or xylene.

8. The multi-layer patch of claim 1, wherein the polyethylene foam of the first polymer adhesive layer or the second polymer adhesive layer is saturated with the solvent.

9. The multi-layer patch of claim 1, wherein the polyethylene of the backing layer, the first polymer adhesive layer, the heating layer, the second polymer adhesive layer or the outer layer is low density, medium density, high density, or ultrahigh molecular weight polyethylene.

10. A multi-layer patch comprising:

a backing layer comprising high density polyethylene;

a first polymer adhesive layer comprising a combination of high density and ultrahigh molecular weight polyethylene foam and solvent at room temperature;

a heating layer comprising a polyethylene mesh and an electrically heated element;

a second polymer adhesive layer comprising a combination of high density and ultrahigh molecular weight polyethylene foam and solvent at room temperature; and an outer layer comprising medium density or high density polyethylene.

11. The multi-layer patch of claim 10, further comprising an ampoule in the first or second polymer adhesive layer.

12. The multi-layer patch of claim 10, further comprising a solvent injection port.

13. The multi-layer patch of claim 10, wherein the electrically heated element is metal wire, metal mesh or wire traces.

14. The multi-layer patch of claim 10, wherein the electrically heated element is attached to the heating layer by stitching.

15. The multi-layer patch of claim 10, wherein the solvent in the first polymer adhesive layer or the second polymer adhesive layer is decalin, tetralin, tetrachloroethylene, tetrachloroethane, or xylene.

16. The multi-layer patch of claim 10, wherein the high density and ultrahigh molecular weight polyethylene foam of the first polymer adhesive layer or the second polymer adhesive layer is saturated with the solvent.

17. The multi-layer patch of claim 10, wherein the backing layer becomes heterogeneously or homogenously incorporated with the first polymer adhesive layer upon application of heat.

18. The multi-layer patch of claim 17, wherein the outer layer becomes heterogeneously or homogenously incorporated with the second polymer adhesive layer upon the application of heat.

19. The multi-layer patch of claim 17, wherein the first polymer adhesive layer and the second polymer adhesive layer become heterogeneously or homogeneously incorporated with the heating layer upon the application of heat.

\* \* \* \* \*

UNITED STATES PATENT AND TRADEMARK OFFICE
CERTIFICATE OF CORRECTION

PATENT NO. : 8,329,291 B2  
APPLICATION NO. : 12/201697  
DATED : December 11, 2012  
INVENTOR(S) : Green et al.

Page 1 of 1

It is certified that error appears in the above-identified patent and that said Letters Patent is hereby corrected as shown below:

CLAIMS

| Column | Line | PTO | Should Read |
|---|---|---|---|
| 13 | 6 | "The multi-lay patch of claim , further" | --The multi-layer patch of claim 1, further-- |

Signed and Sealed this  
Ninth Day of April, 2013

Teresa Stanek Rea  
*Acting Director of the United States Patent and Trademark Office*